(12) United States Patent
Trelewicz et al.

(10) Patent No.: US 7,039,906 B1
(45) Date of Patent: May 2, 2006

(54) COMPILER FOR ENABLING MULTIPLE SIGNED INDEPENDENT DATA ELEMENTS PER REGISTER

(75) Inventors: Jennifer Q. Trelewicz, Superior, CO (US); Michael Thomas Brady, Longmont, CO (US); Joan Laverne Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 09/693,090

(22) Filed: Oct. 20, 2000

Related U.S. Application Data (63) Continuation-in-part of application No. 09/675,779, filed on Sep. 29, 2000.

(51) Int. Cl.
*G06F 9/45* (2006.01)

(52) U.S. Cl. ............... 717/149; 717/159; 708/513; 712/22

(58) Field of Classification Search ........... 717/149, 717/150, 159; 708/498, 513; 712/22
See application file for complete search history.

(56) References Cited

U.S. PATENT DOCUMENTS

| | | | |
|---|---|---|---|
| 3,816,734 A * | 6/1974 | Brendzel | 708/705 |
| 4,752,873 A | 6/1988 | Shonai et al. | |
| 4,956,800 A | 9/1990 | Kametani | |
| 5,021,945 A | 6/1991 | Morrison et al. | |
| 5,218,564 A | 6/1993 | Covey | |
| 5,230,057 A | 7/1993 | Shido et al. | |
| 5,274,818 A | 12/1993 | Vasilevsky et al. | |
| 5,293,631 A | 3/1994 | Rau et al. | |
| 5,303,357 A | 4/1994 | Inoue et al. | |
| 5,341,506 A * | 8/1994 | Nohmi et al. | 712/26 |
| 5,381,531 A | 1/1995 | Hanawa et al. | |
| 5,390,135 A | 2/1995 | Lee et al. | |
| 5,408,670 A | 4/1995 | Davies | |
| 5,410,721 A * | 4/1995 | Divine et al. | 712/245 |
| 5,418,915 A | 5/1995 | Matuda et al. | |

(Continued)

FOREIGN PATENT DOCUMENTS

JP  3257579 A2  11/1991

OTHER PUBLICATIONS

Hank Dietz, "Technical Summary: SWAR Technology," [online] 1997 [accessed Mar. 18, 2004], Retrieved from Internet <URL: http://dynamo.ecn.purdue.edu/~hankd/SWAR/over.html>, pp. 1-5.*

(Continued)

*Primary Examiner*—Tuan Dam
*Assistant Examiner*—Eric B. Kiss
(74) *Attorney, Agent, or Firm*—John L. Rogitz (57) ABSTRACT

A compiler for data processing outputs lower-level code for packing multiple signed data elements per register into a processor's registers using the rules set forth herein, and when executed, the code simultaneously operates on the elements in a register in a single cycle using the same operand. The elements can be independent of each other as defined by compiler directives, and the sizes of the elements in a register can differ from each other. Moreover, a relatively large element can be split across multiple registers. In an exemplary application, a data stream representing two images can be simultaneously processed using the same number of registers as have been required to process a single image. Or, a single image can be processed approaching N-times faster, where N is the number of elements per register. In any case, the present invention results in a significant increase in processing efficiency.

29 Claims, 6 Drawing Sheets

U.S. PATENT DOCUMENTS

| | | | |
|---|---|---|---|
| 5,574,939 | A | 11/1996 | Keckler et al. |
| 5,594,679 | A | 1/1997 | Iwata |
| 5,602,769 | A * | 2/1997 | Yu et al. ............... 708/503 |
| 5,669,010 | A | 9/1997 | Duluk, Jr. |
| 5,689,450 | A | 11/1997 | Kurokawa et al. |
| 5,692,207 | A | 11/1997 | Ho-Lung et al. |
| 5,770,894 | A | 6/1998 | Agarwal |
| 5,774,727 | A | 6/1998 | Walsh et al. |
| 5,818,364 | A | 10/1998 | Hintzman et al. |
| 5,847,978 | A | 12/1998 | Ogura et al. |
| 5,864,703 | A * | 1/1999 | van Hook et al. ............ 712/22 |
| 5,881,259 | A | 3/1999 | Glass et al. |
| 5,907,694 | A | 5/1999 | Suzuki et al. |
| 5,958,038 | A | 9/1999 | Agrawal et al. |
| 5,999,987 | A | 12/1999 | O'Farrell et al. |
| 6,038,652 | A | 3/2000 | Phillips et al. |
| 6,080,204 | A | 6/2000 | Mendel |
| 6,112,299 | A | 8/2000 | Ebcioglu et al. |
| 6,243,803 | B1 * | 6/2001 | Abdallah et al. ........... 712/210 |
| 6,519,052 | B1 * | 2/2003 | Oneda et al. ............. 358/1.16 |

OTHER PUBLICATIONS

Prof. Hank Dietz and Randy Fisher, "Scc: Simd within a register C Compiler," [online] 1998 [accessed Mar. 18, 2004], Retrieved from Internet <URL: http://dynamo.ecn.purdue.edu/~hankd/SWAR/Scc.html>, pp. 1-14.*

Randall Fisher, "General-Purpose SIMD within a Register: Parallel Processing on Consumer Microprocessors," 1997, Ph.D. Thesis Proposal, School of Electrical and Computer Engineering, Purdue University, pp. 1-26.*

Randall J. Fisher, "Issues in the Design of SWAR Programming Models," 1998, Presentation slides, 11th annual Workshop on Languages and Compilers for Parallel Computing (LCPC98), pp. 1-21.*

Randall J. Fisher and Henry G. Dietz, "Compiling for SIMD within a Register," 1998 Workshop on Languages and Compilers for Parallel Computing, North Carolina, Aug. 1998, pp. 1-20.*

Randall J. Fisher and Henry G. Dietz, "The Scc Compiler: SWARing at MMX and 3DNow!," 1999, 12th Annual Workshop on Languages and Compilers for Parallel Computing (LCPC99), pp. 1-15.*

"SWAR: SIMD within a Register (at Purdue ECE)," [online] 1997 [accessed Mar. 18, 2004], Retrieved from Internet <URL: http://dynamo.ecn.purdue.edu/~hankd/SWAR>, p. 1.*

Andrew C. Staugaard, Jr., "Structured and Object-Oriented Techniques: an Introduction Using C++," 1997, Prentice-Hall, Inc., pp. iii, iv, 70, and 75.*

IBM Technical Disclosure Bulletin. "Multisequencing a Single Instruction Stream as High-End Machine". vol. 36, PubNo. 5. pp. 9-12. May 1993.

IBM Technical Disclosure Bulletin. "High Speed Parallel SIGNATURE Board". pp. 114-119, Jun. 1986.

* cited by examiner

Fig. 1 -SYSTEM

Fig. 2 -SYSTEM

Fig. 2A

Fig. 3
REGISTER

Fig. 4
OVERALL FLOW

Fig. 5
ALGORITHM DESIGN

Fig. 6
REGISTER SET UP

Fig. 5A
INITIALIZATION

Fig. 7 EXECUTION

Fig. 8 LOGIC FOR INDEPENDENT ELEMENTS

Fig. 9 ALTO LOGIC FOR INDEPENDENT ELEMENTS

Fig. 10

LOGIC FOR DETERMINING WHETHER ELEMENT
CONTAINED AROUND ZERO

Fig. 11

Fig. 12 LOGIC FOR ARITHMETIC COMPARES

COMPILER FOR ENABLING MULTIPLE SIGNED INDEPENDENT DATA ELEMENTS
PER REGISTER

RELATED APPLICATIONS

This application is a continuation in part of U.S. patent application Ser. No. 09/675,779, filed Sep. 29, 2000, for an invention entitled "SYSTEM AND METHOD FOR ENABLING MULTIPLE SIGNED INDEPENDENT DATA ELEMENTS PER REGISTER" ("the parent application").

BACKGROUND OF THE INVENTION

1. Field of the Invention

The present invention relates to compilers for generating lower-level code from higher-level code to process data in parallel in computer registers.

2. Description of the Related Art

As set forth in the parent application, computer processors function by processing data elements through various registers in accordance with instructions provided by a computer program. The registers have a capacity that is a power of two. For instance, a register might have a capacity of 8 bits, and it would be able to process, in a single processing cycle, a data element having up to eight bits in the element. As an example, an 8-bit register can process a 4-bit data element in a single cycle. Of course, registers typically have sizes larger than 8 bits, i.e., registers can have 16 bit capacities, or 32 bits, or 64 bits, and so on. Non-limiting illustrative examples of the types of operations undertaken by registers include multiplication by a constant, addition, subtraction, shift-left-logical, shift-right-logical, AND, and OR operations.

After the data elements have been processed, they can be sent to another register for further processing, or they can be stored or output. To illustrate, in the printer field a server microprocessor processes an input data stream through its various registers in accordance with a computer program, and it might output a data stream of compressed image data in so-called JPEG format to a printer processor, which then operates on the data as appropriate to instruct a printer apparatus how to print the image.

The processor itself executes instructions in the form of machine language, which are the low-level instructions relating to what data elements are processed through which registers. Most software, however, is written in higher-level programming code such as C, which has the advantages of being human readable and of embodying relatively complex processing operations using comparatively short, quickly-written commands. A compiler receives the high-level programming code, decides the best way among many choices to map it into lower-level language, passes the mapping to an assembler or subsequent compiler which then maps the lower-level language into machine language that is readable by a processor. The higher-level language may be, e.g., C or C++ programming languages with extensions or macros, and the lower-level language may be C with some of the extensions or macros interpreted and removed. Or, the lower-level language may be machine language or assembly language.

From time to time, a programmer may elect to write parts of the program that are executed more frequently than other parts directly in a lower-level language. While more cumbersome to write, these so-called "hand-crafted" portions of code do not have to be translated by a higher level language compiler and, thus, may facilitate faster processing at run time.

Regardless of whether the processor receives the machine code from a compiler or directly from a hand-crafted program, however, the parent application makes the critical observation that it is often the case that register space is wasted. More particularly, as intimated above, a register might not be used to its full capacity in every processing cycle. For instance, when a 16-bit capacity register is used to process 4-bit data elements, 12 bits of the register per cycle are wasted. This slows processing time, creates additional data caching requirements (and attendant cache miss problems), and in general fails to fully exploit processor capacity. Accordingly, the parent application recognizes the potential improvement in processor performance that would inure were multiple data elements to be processed in a register in a single cycle.

The present invention further understands that a compiler can be used to implement the above recognition. This disclosure focusses on such a compiler.

SUMMARY OF THE INVENTION

A general purpose computer is programmed according to the inventive steps herein. The invention can also be embodied as an article of manufacture—a machine component—that is used by a digital processing apparatus such as a computer and which tangibly embodies a program of instructions that are executable by the digital processing apparatus to execute the present logic. This invention is realized in a critical machine component that causes a digital processing apparatus to perform the inventive method steps herein.

Accordingly, a general purpose computer includes a compiler receiving higher-level code and outputting lower-level code to enable a processor to simultaneously process multiple multi-bit data elements in a single register. The logic of the lower-level code that is output by the compiler includes establishing at least first and second signed, multi-bit data elements in at least a first register, and simultaneously processing the elements. The precision for these packed elements determines their packing configuration. In this disclosure, "input precision" is used to reference the initial precision of individual data elements prior to simultaneous operation, while "output precision" is used to reference the final maximum precision of individual data elements prior to simultaneous operations have been completed.

In a preferred embodiment, prior to generating the instructions for packing the data and instructions for simultaneous operations, the compiler may access a flag or a configuration state to decide whether the output precision will be calculated from the input precision by the programmer or by the compiler. When determined by the programmer, the output precision can be specified to the compiler by compiler directives, or by variable definition, or by a configuration file. In contrast, when the output precision is to be determined from the input precision by the compiler, the compiler counts the number and types of operations to be performed on the data, extending the input precision by one bit for each addition or subtraction and by sufficient bits to accommodate multiplication operations, and by one bit when necessary to ensure that the maximum magnitude negative number that can be represented by a data element is one larger than the maximum negative number that can be represented in the output precision.

The compiler may also generate code to undertake operations to make the elements independent of each other after processing, if required by the needs of the program to be executed. To do this, the compiler can access compiler directives or specific higher level language (HLL) syntax to decide whether to make the elements independent of each other, i.e., when to unpack the elements.

In another aspect, a computer program device includes a computer program storage device that can be read by a digital processing apparatus. A compiler program is on the program storage device. The compiler program includes instructions that generate lower-level code that is executable by the digital processing apparatus for processing multi-bit, signed data elements. The compiler program includes computer readable code means for outputting a lower-level code that packs at least first and second data elements into a single register. Also, the compiler program includes computer readable code means for outputting lower-level code to process the elements simultaneously.

In still another aspect, a method includes defining at least one compiler directive for a compiler. The compiler directive defines at least an initial precision for a data element, or multiple data sources of respective data elements to be packed into a common register and operated on by an algorithm simultaneously with each other, or instructions not to compile a predetermined portion of code received by the compiler.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
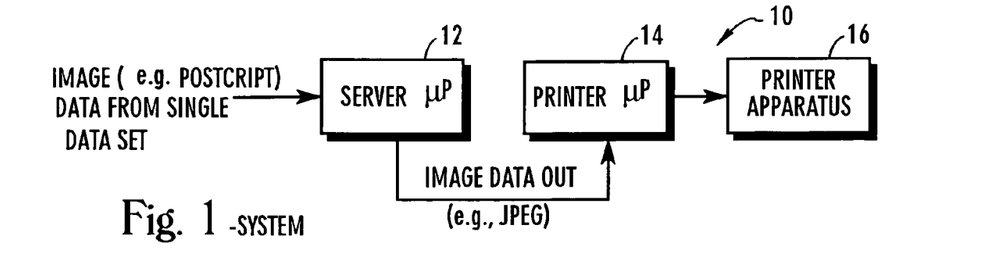
FIG. 1 is a schematic diagram showing the system of the present invention.
Figure 2:
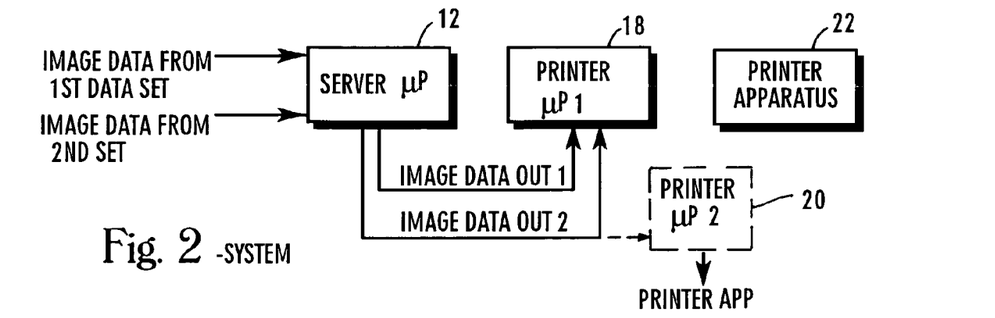
FIG. 2 is a schematic diagram showing an alternate system.

Referring initially to FIGS. 1 and 2, a system is shown, generally designated 10, for enabling the simultaneous processing of multiple signed independent multi-bit data elements per single register of a processor. FIGS. 1 and 2 show various non-limiting ways in which the processing efficiency afforded by the present invention can be exploited. For example, in FIG. 1 a server microprocessor 12 having access to a software-implemented compiler 11 receives a single-source input data stream in, e.g., "TIFF" format that represents an image, and the processor processes the data stream "m" times faster than it would without the benefit of the present invention to output, e.g., compressed image data in JPEG format, wherein "m" is further defined below in terms of data elements per register per cycle. The JPEG data is sent to a printer microprocessor 14, which instructs a printer apparatus 16 to print the image. It is to be understood that the present invention applies generally to all types of data, not just to image data, and that it applies to single-processor systems or to multiple processor systems. For instance, the present invention applies to data communication and processing, voice compression, error-correction coding, multiple channel resolution, etc. Because parallel processing may be performed hereunder using fewer processors, cost/power/size/weight may be reduced.

FIGS. 1 and 2 show the server microprocessor as having access to the compiler 11. It is to be understood that the present compiler can exist elsewhere and only in the final machine code need be loaded into the microprocessor for execution. FIG. 2 shows that the advantages of the system 10 further can be exploited to cause the server microprocessor to simultaneously process two independent data streams from first and second data sets to output respective first and second output streams to a single printer microprocessor 18 or to respective first and second printer microprocessors 18, 20. In turn, each printer microprocessor 18, 20 can control its own printer apparatus (only apparatus 22 shown in FIG. 2), or a single printer microprocessor can control two printer apparatus. In any case, different images (which are examples of different data streams) or different sections of the same image (data stream) can be processed simultaneously by the system 10, such that the core of the processing code remains unchanged.

Figure 2A:
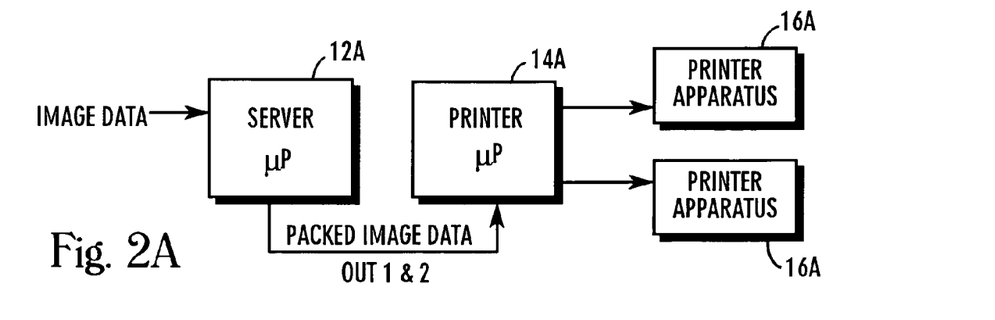
FIG. 2A is a schematic diagram showing yet another alternate system.

FIG. 2A shows that packed image data out 1 & 2 can be sent from a server microprocessor 12A to a printer microprocessor 14A which is programmed to unpack the data for saving bandwidth on the network link between the microprocessors 12A, 14A. In this case, for instance, data out 1 & 2 can be two color components going to respective color engines in respective printer apparatus 16A.

In one intended embodiment, the processor 12 may be a personal computer made by International Business Machines Corporation (IBM) of Armonk, N.Y., or the processor 12 may be any computer, including computers sold under trademarks such as AS400, with accompanying IBM Network Stations. Or, the processor 12 may be a Unix server, or OS/2 server, or Windows NT server, or IBM workstation or an IBM laptop computer. Still further, the present processor which embodies the present registers can be a digital signal processor (DSP), specialized hardware, chips that are built around standard libraries for processing subsystems and arithmetic logic units (ALU). The term "computer register" as used herein refers to registers in all of these data processing units.

With the above overview of the present architecture in mind, it is to be understood that the present logic is executed on the architecture shown in FIG. 1 in accordance with the flow charts discussed below. The flow charts herein illustrate the structure of logic of the present invention as embodied in computer program software and/or programming steps. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, portions of the logic may be embodied by a compiler program 11 that is executed by the processor 12 as a series of computer-executable instructions. These instructions may reside, for example, in RAM of the processor 12 or on a hard drive or optical drive of the processor 12, or the instructions may be stored on a DASD array, magnetic tape, electronic read-only memory, or other appropriate data storage device.

Figure 3:
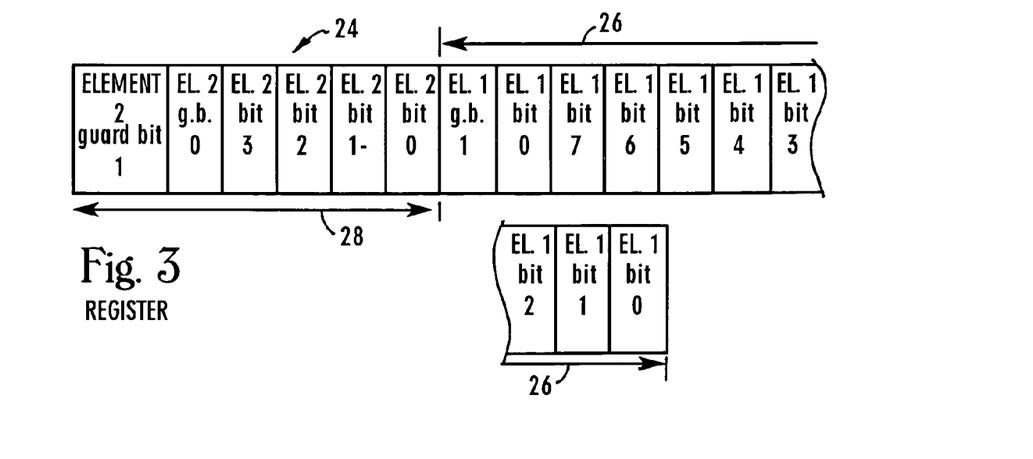
FIG. 3 is a schematic representation of multiple independent bits in a data register.

Now referring to FIG. 3, a register 24 of the processor 12 is schematically shown. In the example, the register 24 is a 16 bit register, and it contains first and second data elements 26, 28. The terms "left" and "right" as used for illustration herein in reference to a register are used in consonance with the order and notation of FIG. 3. Alternate register ordering of the least significant and most significant bits require another convention.

For the illustrative embodiment shown in FIG. 3, the first (right-most) data element 26 contains two guard bits and eight data bits, and thus has an overall "precision" of ten (10), while the second (left) data element 28 has two guard bits and four data bits, and thus has a precision of six (6). In accordance with the present invention, which is directed to twos-complement calculation, the left-most guard bit is a "sign bit" in that it uniquely describes the sign of the element.

It is to be understood that in accordance with present principles, a register 24 can be of any size that is sufficiently large to hold "m" data elements, with the data elements being of the same size or of different sizes. Accordingly, the register of the present invention can be a 32 bit register that holds two 16 bit data elements, or it can hold more than two N-bit elements, or it can be a 64 bit register that holds four 16 bit elements, and so on. In any case, each data element 26, 28 is a multi-bit element that can be either positive or negative and, hence, is a "signed" element, with the sizes of the elements 26, 28 not being constrained to a single predetermined size during manufacture of the processor 12 but rather being definable by a programmer depending on the particular application. It is to be further understood that the register 24 stores elements and, when appropriate, sends data elements to computational subsystems including but not limited to adders, or multipliers, or shifters.

Figure 4:
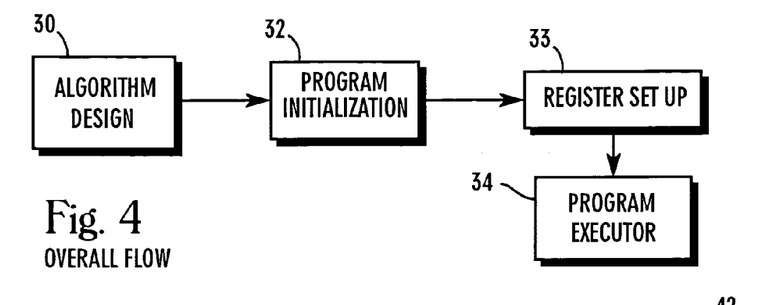
FIG. 4 is a flow chart showing the overall logic of the present invention.

FIG. 4 shows that four stages of development are contemplated herein. In accordance with the present invention, the compiler 1 can undertake the logic, or as disclosed in the parent application portions of the logic can be undertaken by a human programmer. The first step, at block 30, is algorithm design, wherein it is determined whether the particular process under consideration can conform to the present invention. When undertaken by the compiler 11, the step at block 30, discussed in greater detail below, corresponds to the compiler 11 reading higher level code such as C and deciding how to translate it into lower-level code.

The second stage, represented at block 32, is program initialization wherein specifics of implementing the invention in the present registers are determined by the compiler 11, which generates the appropriate initialization code. Then, register set up is undertaken at block 33, where the compiler generates code for packing input data into the target processor registers. The fourth stage is execution, represented at block 34, wherein the generated code is executed on the target processor by a human operator, or an automatic script program, or other means of causing the generated code to run. All of these stages are discussed further below, with blocks 32, 33, and 34 representing how the compiler 11 actually reduces the higher level language to assembly language in accordance with the present invention. As noted above, the compiler alternately can generate conventional higher level language instructions that can then be compiled by a conventional compiler.

Figure 5:
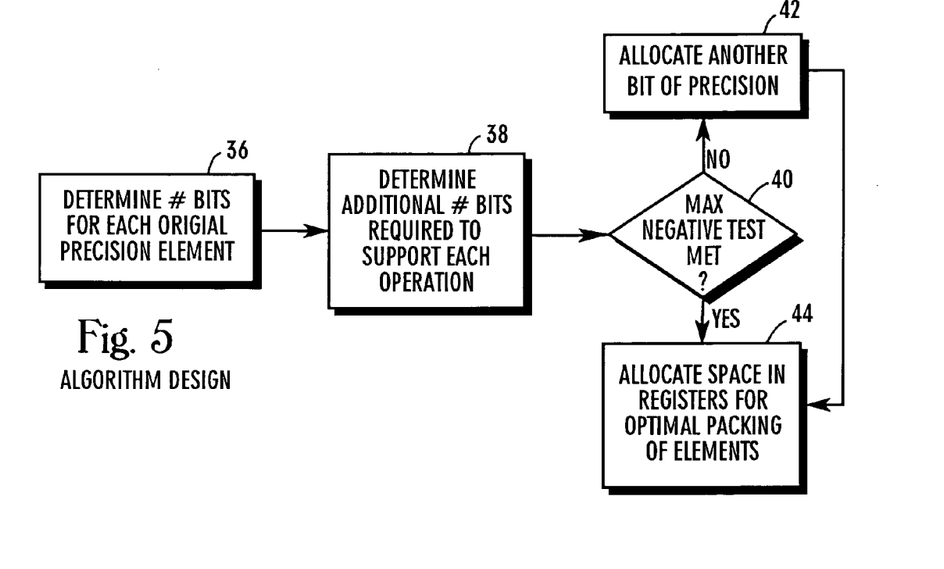
FIG. 5 is a flow chart showing the programmer/compiler logic for verifying the present rules can be met for a process.

With particular regard to the first stage (algorithm design), reference is now made to FIG. 5, the first part of which (up to block 39) represents logic undertaken by the human programmer. Commencing at block 35, the program to be compiled is written in higher-level language. At block 35.1, portions of the program that can be "parallelized" in accordance with disclosure below are identified. Moving to block 35.2, compiler directives are inserted into the program, identifying the "parallelizable" portions.

As an example, FIGS. 7–9 below discuss various execution logic that provides for simultaneous operations on two or more independent data streams, e.g., executing the same algorithm on two or more different images to be printed in parallel. When such is the case, the compiler 11 must know at the algorithm call point and algorithm definition that this might occur, and compiler directives are used to convey this to the compiler 11. Below is an example of such a directive:

```
/*At the point of calling the algorithm*/
#begin parallel_algorithm_calls
signal_processing_algorithm (data_pointer_1);
signal_processing_algorithm (data_pointer_2);
signal_processing_algorithm (data_pointer_3);
signal_processing_algorithm (data_pointer_4);
#end parallel_algorithm_calls
/*At the algorithm definition*/
#parallel_algorithm
void_signal_processing_algorithm (int *data_pointer)
{
    /*...*/
}
```

An in-line parallelizable computation could be specified in the same manner, e.g., by specification inside compiler directives. Yet another compiler directive can be defined to prevent the compiler 11 from performing the parallelization optimization logic on code that the programmer does not wish to have optimized, e.g., if the code has already been hand-crafted (in machine language) by the programmer. An example of such a directive as it might be applied to a loop is:

```
#begin optimization_keepout
while (condition) {
    /*...*/
}
#end optimization_keepout
```

Next, at block 36, the number of bits required for the required precision as dictated by each original data element is determined, i.e., the input precision is determined for each element to be operated on. At decision diamond 37 it is determined whether the compiler will determine the output precision, and if so the programmer specifies the input precision at block 38.4 using compiler directives, or by defining an appropriate variable type, or by using a configuration file. Below is shown an exemplary compiler directive. All of the examples shown herein use the syntax for the "C" programming language, although extensions to other programming languages will be clear to those skilled in the art. Other programming languages to which extensions can be made include but are not limited to FORTRAN, Pascal, Ada, and Java. For example, if the compiler-supported directive were of the exemplary syntax shown as follows, the programmer could write a compiler directive as follows to define an original precision:
fixed_precision 9
int variable_name to define a 9-bit fixed-point variable. Or, if the compiler supports variable declaration syntax such as that shown in the following example, the above step equivalently could be undertaken by defining a new integer type as fixed (9) variable_name. As mentioned above, a third way to define the original precision would be to include a configuration file at compile time that specifies variable scope, name, and precision for selected values.

If, on the other hand, the compiler 11 is not to determine the output precision, the programmer must do so, and accordingly in this event the logic moves from decision diamond 37 to block 38. At block 38, for each data element to be operated on, the additional number of bits of precision that might be required for each operation that the elements will undergo is determined. For instance, adding two elements together might result in an output element that is one bit larger than the input elements.

From block 38, the logic moves to decision diamond 38.1, wherein it is determined whether the precision allocated in block 38 satisfies a maximum negative number rule. By "maximum negative number" is meant the negative number having the largest absolute value. Specifically, at decision diamond 38.1 it is determined whether the maximum negative number that can be represented by the data element is one larger than the maximum negative number that can be represented in the respective precision, e.g., $-2N^{-1}$ in a twos-complement representation with N bits. If not, an additional bit of precision is allocated for the element at block 38.2. The resulting output precision is specified at block 38.3 in the form of compiler directives, variable types, or configuration files.

It is appropriate to note here that when the output precision is determined by the compiler, the system is more robust to programmer error than when the programmer determines the output precision. When the output precision is to be determined by the programmer, however, the compiler 11 has two choices. First, the compiler can generate instructions to perform run-time checking of precision to ensure that underflow (possibly including occurrence of the maximum-magnitude negative number) and overflow do not occur, providing for wrap or saturation if they do occur. Alternatively, the compiler 11 can assume that the programmer has correctly provided sufficient precision, which has the advantage of consuming fewer execution cycles than the run-time checking, but has the disadvantage of potentially allowing overflow and underflow, which could corrupt the contents of the entire register. Accordingly, as envisioned herein a programmer can use the slower but more robust method of having the compiler generate instructions to perform run-time checking to verify implementation, and then during subsequent compiles after execution verification disable run-time checking to speed up execution.

In any case, either the output precision from block 38.3 or input precision from block 38.4 is sent to the compiler 11, with the remainder of FIG. 5 representing compiler 11 logic. At block 39, the compiler 11 reads the files mentioned above. Any parallelization directives are identified at block 39.1 by analyzing the higher level code or by reading compiler directives. Proceeding to decision diamond 40, the compiler 11 determines whether it is to determine the output precision (e.g., by counting operations). The compiler makes this determination by accessing a compiler directive, a flag, or a configuration file. If the test is positive, the input precisions of the elements to be operated on in parallel are read at block 41.1, with the compiler 11 then essentially repeating, at state 41.2, the logic discussed above in relation to states 38.1, 38.2, and 38.3 to generate the output precision. In contrast, when the compiler 11 is not to determine the output precisions of the elements, this means that the output precisions from block 38.3 are read at block 41.3.

Proceeding to block 42, variables to be processed in parallel are grouped. Next, at block 43, the compiler 11 allocates sufficient space in the registers for optimal packing of elements, i.e., it is determined how to most efficiently fill the available registers on the target processor with the available data elements that are to be simultaneously held in a register with other elements, such that a minimum amount of unused register capacity is achieved. For example, for a tight packing of an 8 bit original data element that is to undergo a maximum of six addition operations, the precision allocated to that element would be (8+6)=14. At block 44.1, the instructions generated that implement the below-described "parallelization" methods are accessed, and the non-parallelizable portions of the program are compiled/translated at block 44.2. The resulting lower-level code is output at block 44.3 for running as described below on a processor to process elements in parallel.

Figure 5A:
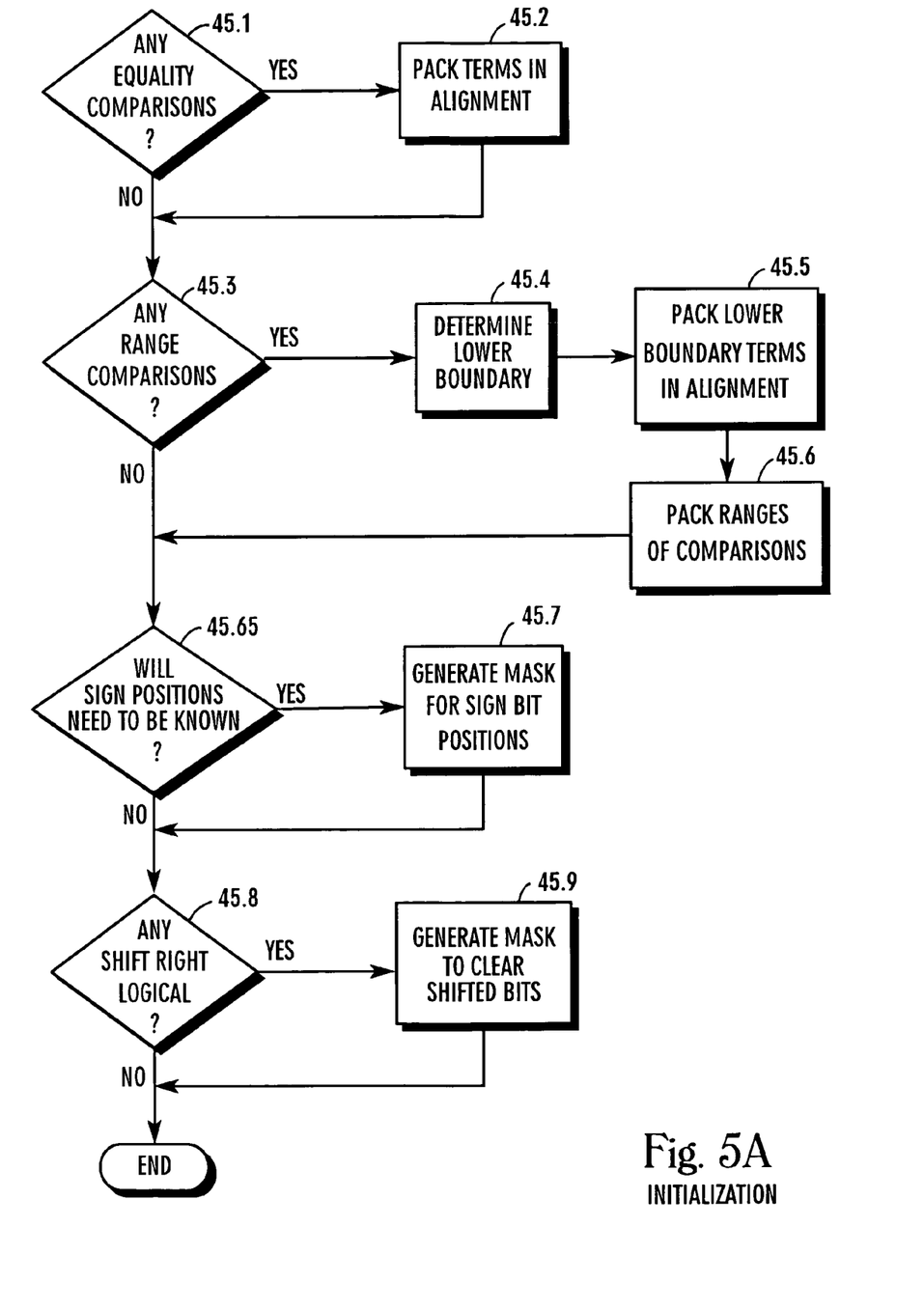
FIG. 5A is a flow chart showing the program initialization logic.

FIG. 5A shows the program initialization logic performed by the compiler and implemented in lower-level code that is output by the compiler 11. At decision diamond 45.1 the compiler determines whether any equality comparisons will be undertaken. If so, the compiler generates code to pack equality comparison terms on element alignments at block 45.2, i.e., the terms to be compared with each other are packed into respective registers or constants or variables in identical register positions. The flow of FIG. 5A also illustrates that at decision diamond 45.3, the compiler determines whether any range comparisons will be undertaken, and if so either the compiler determines the lower boundary for each such comparison or the compiler generates code for determining the lower boundary for each such comparison, which is determined at block 45.4. Then, at block 45.5 the compiler generates code for packing lower boundary terms on element alignments. From block 45.5, the logic moves to block 45.6, wherein the compiler generates code to pack the ranges of comparison.

From block 45.6 or from decision diamond 45.3 when the test there is negative, the logic flows to decision diamond 45.65, wherein it is determined whether sign positions of elements will need to be known. If so, the compiler generates a mask at block 45.7 for masking sign bit positions as discussed further below. From block 45.7 or from decision diamond 45.65 when the test there is negative, the logic flows to decision diamond 45.8, wherein it is determined whether any shift right logical operations will be performed. If so, the compiler generates a mask at block 45.9 for clearing shifted bit positions as discussed further below.

Figure 6:
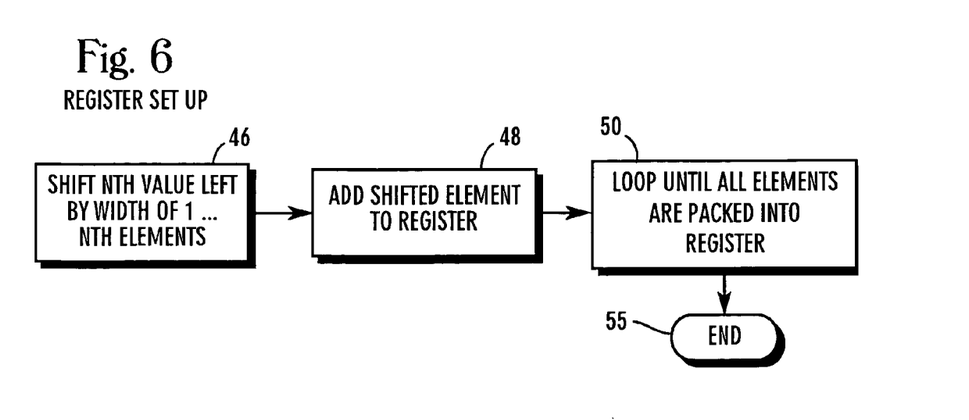
FIG. 6 is a flow chart showing the register set up logic.

FIG. 6 shows the register set up logic undertaken by the output code of the compiler 11. More particularly, it is to be understood that the logic of the remaining figures is undertaken by the code that is generated by the compiler 11.

Commencing at block 46, for a register having "m" values, the mth value is shifted left (again in terms of the directions illustrated in FIG. 3) by a width of the values to its right, i.e., by a width of 1 . . . , (m−1) values. At block 48, the element containing the value shifted at block 46 is added to the designated register. Block 50 indicates that the process of blocks 46 and 48 is looped through until all elements that are to be packed in the register are added to the register. The logic ends at state 55. It is to be understood that original elements can be split into sub-elements that are processed in different registers as elements in and of themselves, and then recombined after processing. For example, if two complete data elements plus two sets of extra precision that might be required by the particular process do not fit into one register, then one complete element plus a partial element with two sets of extra precision can be processed through one register while the remainder sub-element can be processed through another register on the target processor. When all of the input data elements are known to be positive and are already packed with no guard bits, the packing process may be simpler and may consist of shift and mask operations that select every other element and leave the results in two registers with guard bits equal to the input precision of the data elements.

When the above conditions are met for all data elements that are to be processed in accordance with the present invention, a carry propagating left (in terms of the exemplary register 24 shown in FIG. 3) without a previous borrow having occurred can never happen. This is desirable, because a carry propagating left without a previous borrow would otherwise indicate an element overflow into the neighboring element. Moreover, satisfying the maximum negative test ensures that a borrow can only follow a borrow in underflow conditions, since it provides for the borrow required for the sign reversal from the element to the immediate right of the affected element. It follows that in any one processing cycle, at most one borrow has occurred from each element in the register, and the borrow is signified by the presence of a "1" bit in the adjacent (to the right) element's sign bit (the sign bit is an element's most significant bit).

Figure 7:
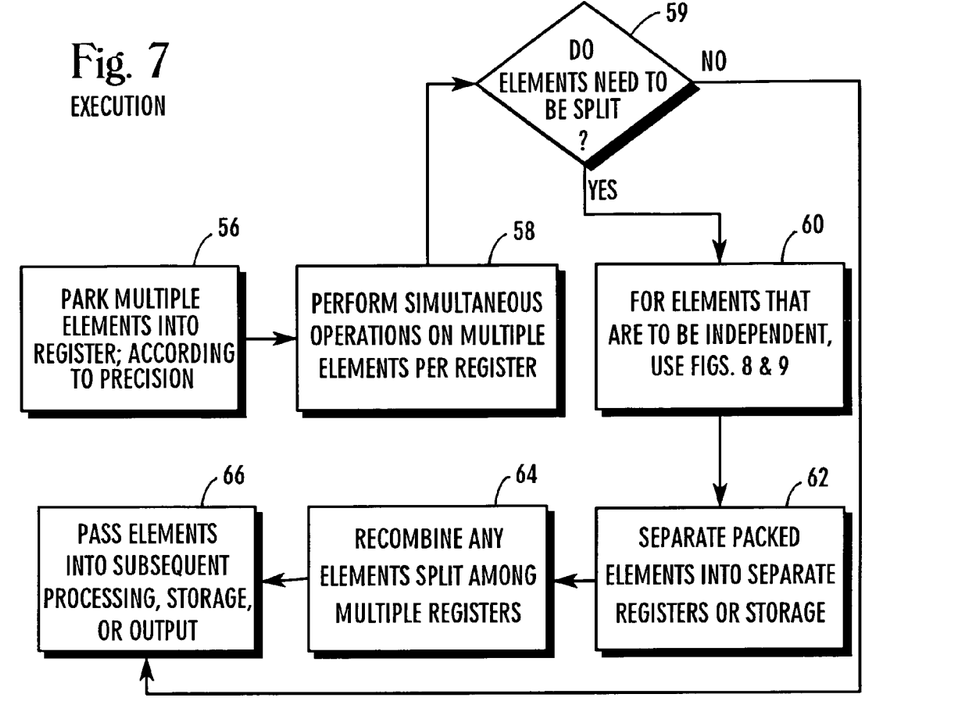
FIG. 7 is a flow chart showing the overall execution logic.

Once the register set up process is complete, the input data stream can be processed by executing the logic shown in FIG. 7, wherein the compiler generates the lower-level code for the logic shown therein. At block 56 the data elements are packed into the processor 12 registers according to the space allocations discussed above. Specifically, multiple multi-bit, signed data elements are packed into at least one register of the processor 12 at block 56. Then, in each processing cycle in each register holding multiple data elements, the data elements are simultaneously processed by identical operations, i.e., by the operation embodied by the program. One-cycle operations include addition/subtraction of two registers, addition/subtraction of immediate values, shift-left logical, positive or negative multiplication by a single value or by a variable of known precision, equality operations, AND operations with the sign bits, and OR operations of the sign bits. Also, arithmetic comparisons for the element in the highest order (left-most) bits of the register can be performed against predetermined numbers in a single cycle, with such comparisons for lower-order elements in a register requiring an extra cycle to copy them and shift them to the highest-order bits in another register or the same register if the highest-order bits can be discarded after comparison. Shift-right arithmetic, shift-right logical, some comparisons, and negation all require extra cycles, but can be accomplished for all elements in the multiple cycles. For elements in separate registers that are to be compared to each other, added to each other, or subtracted from each other, the corresponding elements must be aligned, i.e., a first element in a first register that is to be compared or added to, or subtracted from, a second element in a second register must occupy the same register position in the first register as the second element occupies in the second register.

After the simultaneous operations, the logic flows to decision diamond 59, wherein it is determined whether elements must be split. Specifically, elements in a single register that are simultaneously operated on might need to be independent of each other as defined by the above-mentioned compiler directives or at the end of a parallel execution block. In the compiler-generated code, after the code to perform the simultaneous operations, if the elements need to be split, the compiler must insert the lower-level code for performing the split. This logic is reflected in decision diamond 59, which indicates that after instructions are generated that simultaneously operate on packed, independent elements in a single register, instructions are generated to separate them from each other in accordance with the logic of FIG. 8 or 9 discussed below. In general, for independent elements the logic moves to block 62, wherein the processed data elements in a register are split apart and sent to separate registers or to storage. At block 64, any elements that were sub-elements of a large element are recombined with each other. From block 64, or from decision diamond 59 in the case wherein the packed elements in a register need not be independent of each other, the elements are sent on for storage, output, or further processing at block 66.

Figure 8:
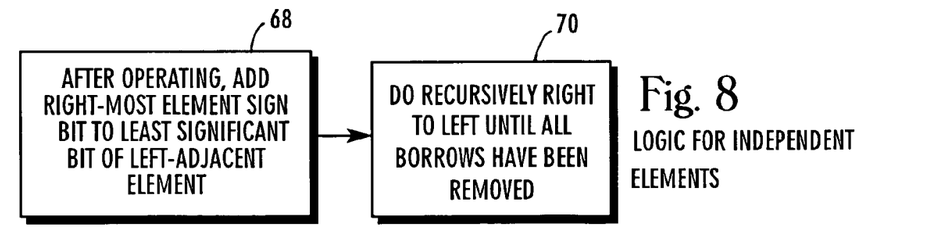
FIGS. 8 and 9 are flow charts showing alternative logic flows for implementing independent elements in a single register.

FIGS. 8–12 illustrate various preferred details of the present invention as implemented in the output of the compiler 11. Referring to FIG. 8, a first logic flow for making elements in a register independent of each other can be seen. Commencing at block 68, after operating on the elements at block 58 in FIG. 7, the sign bit of the right-most element (again in terms of the exemplary register 24 shown in FIG. 3) is added to the least significant bit of the immediately adjacent element to the left. Block 70 indicates that when more than two elements are contained in a register, the step at block 68 is undertaken recursively, effectively removing all borrows between elements.

Figure 9:
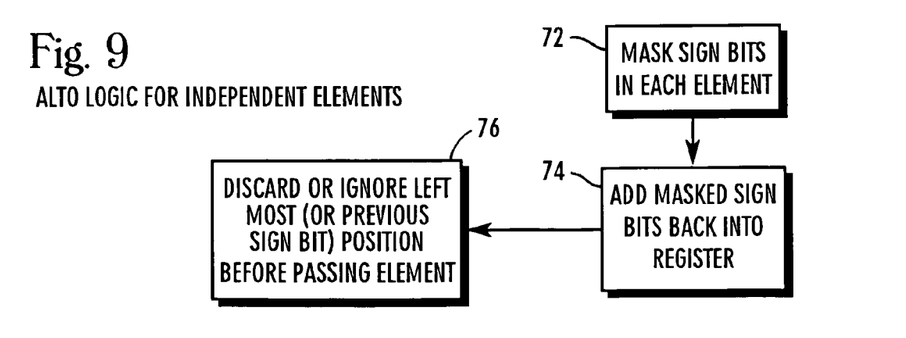

Alternatively, the logic of FIG. 9 can be invoked to make elements independent. Commencing at block 72 in FIG. 9, when elements in a register must be made completely independent of each other after processing and the bit following the sign bit of an element is identical to the sign bit (meaning the sign bit can be sacrificed), a mask selecting all of the sign bits in a register is applied to a copy of the register and added back into the register at block 74. This clears all sign bits until a carry or borrow arrives, with the cleared sign bit position of an element capturing carries and borrows from its right-adjacent neighbor. By "mask sign bits" is meant performing a bitwise AND of the register with a pattern that has "1" in the sign bit position and "0" elsewhere. Masking and discarding of the leftmost element's sign bit can be undertaken or not, since the leftmost element has no other elements to its left with which to interact.

Then, the value in the left most (or previous sign bit) position of each element is discarded or ignored at block 76 before passing the element on. Although the above operation results in decreasing the precision per data element, it renders the elements independent of each other in fewer cycles than the recursive method shown in FIG. 8, with the corrupted data in the sign bit positions being discarded. The discarding can be undertaken by an extra left shift as part of left justification in the register for comparison purposes or by a mask to selectively pick off each corrupted bit.

Figure 10:
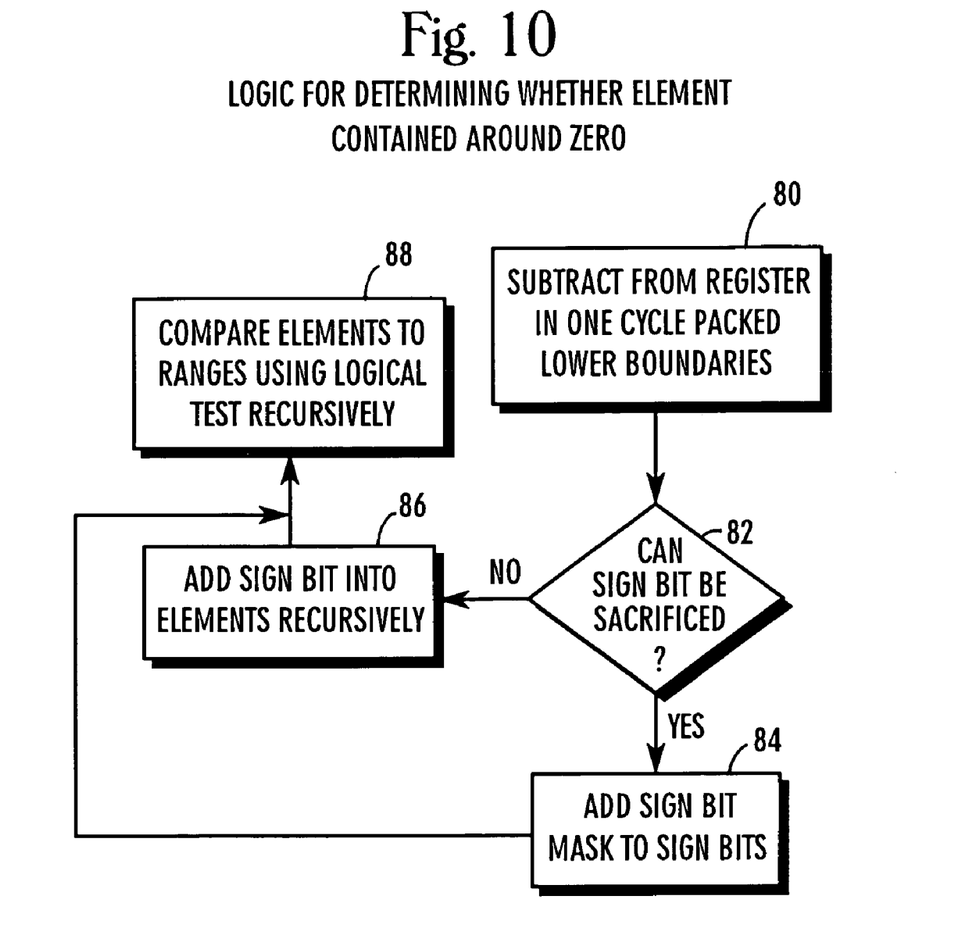
FIG. 10 is a flow chart showing the logic for determining whether an element is contained around zero.

Now referring to FIG. 10, the logic implemented in the compiler-generated lower-level code for determining whether a data element is contained around zero (for, e.g., JPEG quantization to zero) can be seen. At block 80 the packed lower boundaries of the range are subtracted from the register in one cycle. Moving to decision diamond 82, it is determined whether the sign bit of the element under test (i.e., undergoing the comparison) can be sacrificed in accordance with principles discussed above. If so, the above-mentioned sign bit mask is added to mask the sign bits at block 84. Then, at block 88 the element under test is compared to the respective range in a single logical test. Since an extra unused bit of precision has been provided for the data elements, the sign bit remains present in the second-from-the-left position in each element. The process at block 88 from block 84 is looped on until all elements are compared.

In contrast, when the test at decision diamond 82 is negative, the sign bit is added into the neighboring element at block 86. Then, at block 88 the element under test is compared to the top boundary in a single logical test and the process at blocks 86 and 88 is looped on until all elements are compared.

In relation to the discussion of FIG. 10, after the comparison at block 88, the elements should be masked to zero or shifted left one at a time, so that the comparison is always done for the left-most nonmasked element in the register against the boundary.

Figure 11:
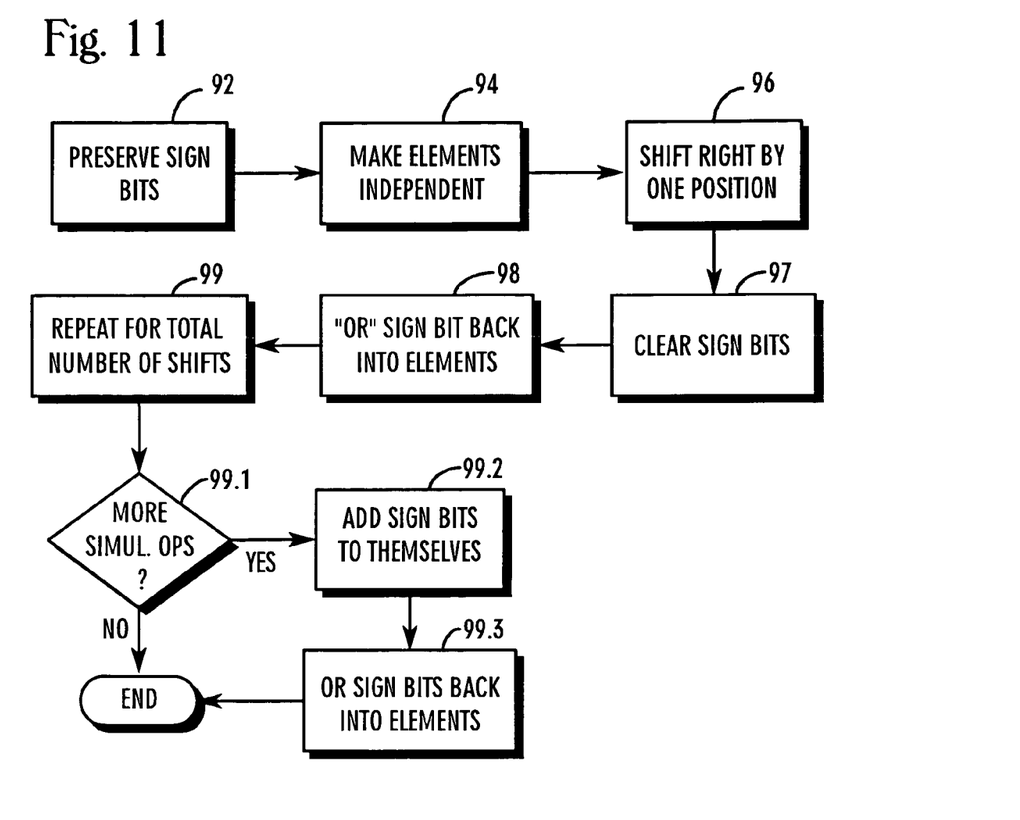
FIG. 11 is a flow chart showing the logic for shift right arithmetic.

FIG. 11 shows the logic implemented in the compiler-generated lower-level code for shift-right arithmetic. Commencing at block 92, the sign bits of each element are preserved in a separate register. Moving to block 94, the elements are made independent as disclosed above using FIGS. 8 and 9, and then at block 96 shift right arithmetic is undertaken by one position. Next, at block 97 the sign bit positions for the elements in a register are cleared in one cycle. At block 98, the sign bit for each element is OR'ed back into the register, with the steps at blocks 96 and 98 being repeated as indicated at block 99 until the shift is completed. If more operations are to be performed as determined at decision diamond 99, the packed format can be restored by subtracting the new sign bits one at a time from right to left, letting them ripple through the register. This is done, as indicated in FIG. 11, by adding the sign bits to themselves at block 99.2 and then OR'ing the sign bits back into the elements at block 99.3.

Figure 12:
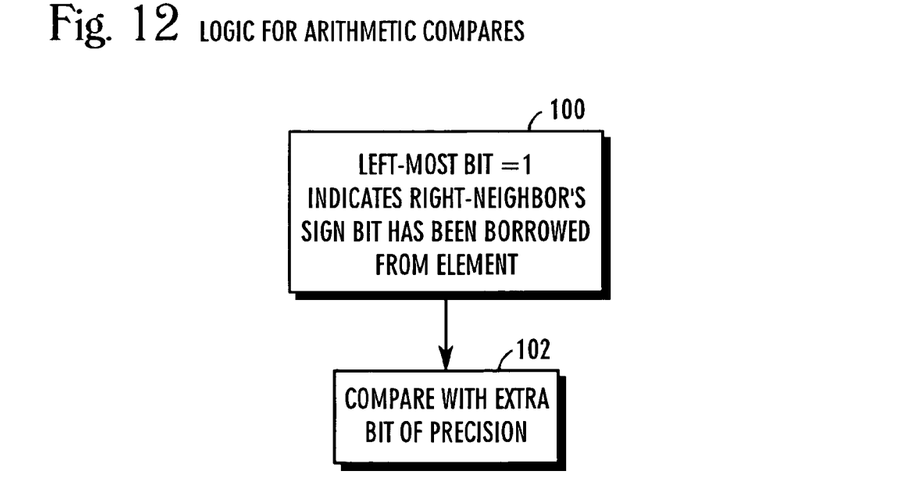
FIG. 12 is a flow chart showing the logic for arithmetic compares.

FIG. 12 shows how to use an extra bit of precision to undertake arithmetic comparisons. Commencing at block 100, the present invention defines a value for a 4-bit element of xxxx0 to be the correct value, and a value of xxxx1 to indicate that the right-adjacent value's sign bit has been borrowed from the value. At block 102, the value is then compared with the extra bit of precision.

While the particular COMPILER FOR ENABLING MULTIPLE SIGNED INDEPENDENT DATA ELEMENTS PER REGISTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer system, comprising:
    a compiler receiving higher-level code and outputting lower-level code to enable a processor to simultaneously process multiple multi-bit data elements in a single register, the logic of the lower-level code including:
    establishing at least first and second signed, multi-bit data elements in at least a first register; and
    simultaneously processing the elements, wherein it least one of: a carry, and a borrow, may occur between data elements in a register.

2. The computer system of claim 1, wherein the compiler accesses at least one of: a compiler directive, a flag, of a configuration file, to decide when to make elements independent of each other.

3. The computer system of claim 2, wherein the compiler generates instructions to pack multiple data elements from respective data sources into a common register to be operated on by an algorithm simultaneously with each other.

4. The computer system of claim 3, wherein the first element is a first partial element having a related second partial element established in a second register, and the lower-level code output by the compiler causes the first and second partial elements to be combined after processing.

5. The computer system of claim 1, wherein a first element is provided from a first data set and a second element is provided from a second data set different than the first.

6. The computer system of claim 1, wherein the compiler allocates a respective output precision in a register for each data element to be processed in the register during a single cycle.

7. The computer system of claim 6, wherein the compiler determines the output precision based at least in part on an input precision.

8. The computer system of claim 7, wherein the compiler adds a bit of precision if the maximum magnitude negative number that is required for the data during processing is the maximum magnitude negative number that can be represented in the respective precision.

9. The computer system of claim 7, wherein the compiler adds at least one bit of precision based at least in part on an operation on a data element.

10. The computer system of claim 6, wherein the compiler receives, as input, the output precision.

11. The computer system of claim 1, wherein the compiler receives instructions not to compile a predetermined portion of code received by the compiler.

12. The computer system of claim 1, wherein an output precision or an input precision is defined by means of a compiler directive, or a configuration file, or a variable definition.

13. A computer program device comprising:
a computer program storage device readable by a digital processing apparatus; and
a compiler program on the program storage device and including instructions executable by the digital processing apparatus for performing method acts for outputting lower-level code to process multi-bit, signed data elements, the lower-level code comprising:
computer readable code means for packing at least first and second data elements into a single register; and
computer readable code means for processing the elements simultaneously, the elements being permitted to interact with each other.

14. The computer program device of claim 13, further comprising;
flag means indicating whether a precision should be checked in at least one cycle.

15. The computer program device of claim 13, further comprising:
compiler directive means for defining an input precision.

16. The computer program device of claim 13, further comprising:
compiler directive means for defining multiple data sources of respective data elements to be packed into a common register and operated on by an algorithm simultaneously with each other.

17. The computer program device of claim 13, further comprising:
means for indicating whether a precision should be checked;
means responsive to the means for indicating for checking that the packed elements do not overflow or underflow or achieve a maximum magnitude negative number representable in the precision; and
means for, when packed elements overflow or underflow or achieve a maximum magnitude negative number representable in the precision in a cycle, undertaking wrap or saturation in the elements to prevent corruption of other data elements in a register, or signalling an error to be handled by an error-handling routine in the program.

18. The computer program device of claim 13, further comprising means for adding a bit of precision if the maximum magnitude negative number that is required for the data during processing is the maximum magnitude negative number that can be represented in the respective precision.

19. The computer program device of claim 13, further comprising means for adding at least one bit of precision based at least partially on an operation on a data element.

20. A method, comprising:
defining at least one compiler directive, instructions, or configuration file for a compiler defining at least one of;
an input precision for at least one data element; and
multiple data sources of respective data elements to be packed into a common register and operated on by an algorithm simultaneously with each other, wherein the data elements can carry from each other, and wherein a carry propagating left without a previous borrow having occurred cannot happen and further wherein a borrow can only follow a borrow in underflow conditions such that in any one processing cycle at most one borrow occurs from each element in the register.

21. The method of claim 20, wherein the compiler determines first and second precisions to be allocated in a single register to hold respective first and second signed data elements, and the compiler generates a lower-level code from a higher level code to undertake method acts comprising:
packing the elements into the register; and
operating on the elements.

22. The method of claim 21, wherein the register sends plural data elements simultaneously to at least one computational subsystem.

23. The method of claim 22, wherein the operation is a multiplication by a constant or by a variable of known precision, or an addition, or a shift-left logical, or a subtraction, or a bitwise AND, or a bitwise OR.

24. The method of claim 23, wherein the elements are independent of each other as defined by the compiler directive or configuration file.

25. The method of claim 24, wherein the first element is provided from a first data set and the second element is provided from a second data set different than the first.

26. The method of claim 21, wherein the first element is a first partial element having a related second partial element established in a second register, and the lower-level code causes the first and second partial elements to be combined after processing.

27. The method of claim 21, wherein the act of determining first and second precisions includes determining the precisions such that the maximum negative number that can be represented in an element is one larger than the maximum negative number that can be represented in the respective precision.

28. The method of claim 20, wherein the compiler directive, instructions, or configuration file embodies instructions to compile predetermined portions of code received by the compiler to be executed simultaneously on packed data.

29. The method of claim 20, further comprising defining instructions not to compile a predetermined portion of code received by the compiler.

* * * * *